(12) United States Patent
Heard

(10) Patent No.: US 7,092,920 B2
(45) Date of Patent: Aug. 15, 2006

(54) METHOD AND APPARATUS FOR DETERMINING ONE OR MORE STATISTICAL ESTIMATORS OF CUSTOMER BEHAVIOR

(75) Inventor: Nicholas Heard, London (GB)

(73) Assignee: NCR Corporation, Dayton, OH (US)

( * ) Notice: Subject to any disclaimer, the term of this patent is extended or adjusted under 35 U.S.C. 154(b) by 1066 days.

(21) Appl. No.: 09/865,828

(22) Filed: May 24, 2001

(65) Prior Publication Data

US 2002/0099594 A1    Jul. 25, 2002

(30) Foreign Application Priority Data

May 26, 2000  (GB) .................................. 0013011

(51) Int. Cl.
*G06F 15/18*        (2006.01)
(52) U.S. Cl. ...................................................... 706/12
(58) Field of Classification Search ................... 706/20, 706/12, 13; 705/10, 39
See application file for complete search history.

(56) References Cited

U.S. PATENT DOCUMENTS

| 4,872,122 | A | * | 10/1989 | Altschuler et al. ........... 356/432 |
| 5,704,017 | A | | 12/1997 | Heckerman et al. ............ 706/12 |
| 6,212,510 | B1 | * | 4/2001 | Brand .......................... 706/62 |
| 6,480,832 | B1 | * | 11/2002 | Nakisa ......................... 706/13 |

FOREIGN PATENT DOCUMENTS

WO        9909503        2/1999

* cited by examiner

*Primary Examiner*—Anthony Knight
*Assistant Examiner*—Michael B. Holmes
(74) *Attorney, Agent, or Firm*—Michael Chan

(57) ABSTRACT

Businesses typically have large amounts of data about customer transactions and other customer information which is not fully utilized. The present invention provides a means of using this information to make predictions about future customer behavior, for example by estimating the probability that a customer will leave a bank. Using these predictions the business is able to take action in order to improve its performance. Using customer data a Bayesian statistical model is generated and this model used to generate statistical estimators of customer behavior. The statistical model is formed using hidden Markov model techniques by clustering customer data and attributes (e.g. Age, sex, salary) into a finite number of states. The number of states is unobserved and considered random. Bayesian prior probability distributions are specified and combined with the data to produce Bayesian posterior probability distributions. Using these Bayesian posterior probability distributions the statistical estimators are obtained. For example, Monte Carlo sampling techniques are used or alternatively the posterior distributions are calculated numerically or analytically.

4 Claims, 2 Drawing Sheets

METHOD AND APPARATUS FOR DETERMINING ONE OR MORE STATISTICAL ESTIMATORS OF CUSTOMER BEHAVIOR

BACKGROUND OF THE INVENTION

This invention relates to a method and apparatus for determining one or more statistical estimators of customer behavior. The invention is particularly related to, but in no way limited to, modeling customer behavior using a Bayesian statistical hidden Markov model technique.

Businesses typically have records of customer transaction histories. These records contain information that is potentially very valuable to the business because it enables the business to analyze customer behavior and use this "feedback" to help plan the future of the business. However, assessments of the available data only provide information about customer behavior that has already occurred. This is a drawback because behavior patterns typically change over time. For example, a customer who is at present not very profitable could become more profitable in the future. There is thus a need to predict the future behavior of customers.

One particular example concerns a business such as a bank which wishes to predict when a customer is likely to leave the bank. In that case such a prediction would be extremely advantageous because it allows the bank to take action such as to give incentives to the customer to prevent them from leaving.

Bayesian statistical techniques have been used to "learn" or make predictions on the basis of a historical data set. Bayes' theorem is a fundamental tool for a learning process that allows one to answer questions such as "How likely is my hypothesis in view of these data?" For example, such a question could be "How likely is a particular future event to occur in view of these data?"

Bayes theorem is written as:

$$P(H/\text{data}) = \frac{P(\text{data}/H)P(H)}{P(\text{data})}$$

Which can also be written as:

$$P(H/\text{data}) \propto P(\text{data}/H) \cdot P(H)$$

Because P(data) is unconditional and thus does not depend on H.

The probability of H given the data, P(H/data) is called the posterior probability of H. The unconditional probability of H, P(H) is called the prior probability of H and the probability of the data given H, P(data/H) is called the likelihood of H. By using knowledge and experience about past data an assessment of the prior probability can be made. New data is then collected and used to update the prior probability following Bayes theorem to produce a posterior probability. This posterior probability is then a prediction in the sense that it is a statement about the likelihood of a particular event occurring in the future. However, it is not simple to design and implement such Bayesian statistical methods in ways that are suited to particular practical applications.

SUMMARY OF THE INVENTION

It is accordingly an object of the present invention to provide a method and apparatus for determining one or more statistical estimators of customer behavior, which overcomes or at least mitigates one or more of the problems noted above.

According to an aspect of the present invention there is provided a method of determining one or more statistical estimators of future customer behavior comprising the steps of:

accessing data about past customer behavior;

generating a Bayesian statistical model using the data about the past customer behavior; and using the model to generate one or more statistical estimators of future customer behavior.

A corresponding computer system is provided for determining one or more statistical estimators of future customer behavior comprising:

an input arranged to access data about past customer behavior;

a processor arranged to generate a Bayesian statistical model using the data about the past customer behavior; and wherein said processor is further arranged to use the model to generate one or more statistical estimators of future customer behavior.

A corresponding computer program is provided for controlling a computer system such that one or more statistical estimators of future customer behavior are determined said computer program being arranged to control the computer system such that:

data about past customer behavior is accessed;

a Bayesian statistical model is generated using the data about the past customer behavior; and using the model, one or more statistical estimators of future customer behavior are generated.

This provides the advantage that the statistical estimators of future customer behavior are obtained and these may be used by a business, for example, to improve its performance. The data about past customer behavior may comprise information about customer transactions such as cash machine withdrawal frequency. By using the method future customer transactions can then be predicted.

Preferably the method further comprises accessing information about customer attributes and wherein said model is generated using the information about customer attributes. This gives the advantage that the model is improved and found to enable good statistical estimators of future customer behavior to be produced. The customer attributes could be the age, sex and salary of customers for example.

It is also preferred that the model comprises a representation of the customer behavior in the form of a hidden Markov model with a random number of states. Moreover, it is preferred that the step of generating the model comprises clustering the past customer behavior data into a plurality of states. It has unexpectedly been discovered that this type of statistical model is particularly effective for modeling customer behavior data such as information about bank customers.

Advantageously, the behavior of each customer over time is represented as a path through a plurality of the states and wherein these paths are unobserved and are considered random. This enables the evolution of customer behavior over time to be modeled and in this way predictions about future customer behavior can then be obtained from the model.

Preferably, each state is characterized by a random state parameter and preferably the model uses multi-variate customer data. That is a plurality of customer attributes such as age, sex and salary are used. This enables the model to be more effective for customer data and for particular applications such as predicting the future behavior of bank customers.

BRIEF DESCRIPTION OF THE DRAWINGS

Further benefits and advantages of the invention will become apparent from a consideration of the following detailed description given with reference to the accompanying drawings, which specify and show preferred embodiments of the invention.

DETAILED DESCRIPTION

Embodiments of the present invention are described below by way of example only. These examples represent the best ways of putting the invention into practice that are currently known to the Applicant although they are not the only ways in which this could be achieved.

Consider a business such as a bank. This bank may have beliefs, experience and past data about customer transactions. Using this information the bank can form an assessment of the prior probability that a particular customer will exhibit a certain behavior, such as leave the bank. The bank may then collect new data about that customer's behavior and using Bayes' theorem can update the prior probability using the new observed data to give a posterior probability that the customer will exhibit the particular behavior such as leaving the bank. This posterior probability is a prediction in the sense that it is a statement of the likelihood of an event occurring. In this way the present invention uses Bayesian statistical techniques to make predictions about customer behavior. However, as mentioned above, it is not simple to design and implement such methods in ways that are suited to particular applications. The present invention involves such a method and is described in more detail below.

Figure 1:
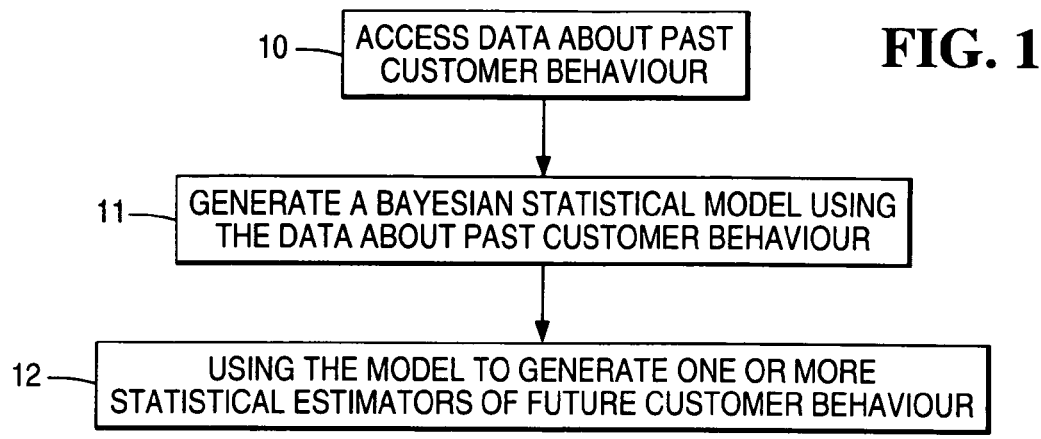
FIG. 1 is a flow diagram of a method of generating statistical estimators of customer behavior.

FIG. 1 is a flow diagram of a method of determining statistical estimators of customer behavior. Data about past customer behavior is accessed (box 10 of FIG. 1). For example, this data comprises information about customer transactions such as the frequency of cash withdrawals at a Bank's ATM machines and the amount of money withdrawn each time. Using this data a Bayesian statistical model is generated (see box 11 of FIG. 1) and this model is then used to generate one or more statistical estimators of future customer behavior (box 12 of FIG. 1). As well as data about past customer behavior, customer attributes such as age, sex and salary may be used to create the model.

The Bayesian statistical model that is used may be any suitable type of model which clusters the customer data and attributes into a finite number of states. Any suitable type of hidden Markov model technique may be used to achieve this.

Figure 3:
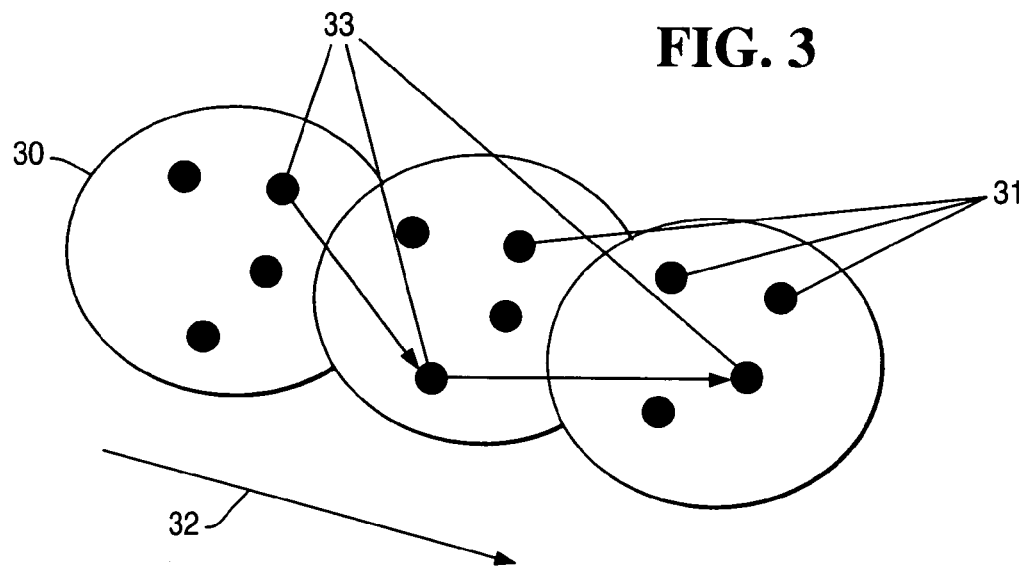
FIG. 3 is schematic diagram of a path between states which represents a customer's behavior over time.

In this way the Bayesian statistical model represents customer behavior using a plurality of states (the number of which is unknown and considered random) where each state is characterized by a plurality of parameters. At a given point in time a customer's behavior is represented using one of these states; that is the customer's behavior at a particular time is a member of a particular state. All customers within a state are assumed to have behavior that is homogeneous in some way. These states may be found to correspond to particular lifestyle groups such as employed single people, unemployed people, students etc. However, it may well also be the case that the clusters or states generated by the model do not correspond to lifestyle groups or other classes that are meaningful in social terms. In order to represent a customer's behavior over time, the model uses an unobserved path through these states. This is illustrated schematically in FIG. 3. Time snapshots are represented by large circles 30 and within these clusters or states are represented by smaller black circles 31. Arrow 32 represents time. Suppose that a particular customer has behavior at a first time that is represented by cluster 33 of the left most circle 30. The behavior of that customer over time is then represented as a path between a state in each time shot circle 30. For example, FIG. 3 shows such a path 33 for a customer who changes behavior in each time shot. Thus customers are considered to move through different states over time, according to state transition probabilities, as their customer data and attributes evolve. In the statistical model used the paths of each customer through the states over time are not observed and are estimated or considered random. Also, each state k is characterized by a random state parameter $\theta^{(k)}$. Observed customer transactions whilst they are in state k are assumed to follow a parametric probability model $p(\text{Data}|\theta^{(k)})$.

A particular advantage of the present invention is that the model is arranged to deal with customer data comprising more than one parameter or attribute per customer. That is, the hidden Markov model technique used is arranged to use data that is not univariate. For example, a plurality of attributes for each customer (e.g. age, sex, salary) are used together with transaction data such as frequency of cash withdrawals from ATM machines. By using data that is multivariate (as opposed to univariate data) the model is improved such that the results are more accurate predictions of customer behavior. As described below, Robert et al. (see section headed "references" below for full publication details) have described use of a hidden Markov model with a random number of states, but for only one time series of univariate data. Also, Robert et al did not consider applying these techniques to customer data such as information about transactions and withdrawals from cash machines. It is not obvious that clustering techniques such as hidden Markov models are effective at dealing with such customer data and it has unexpectedly been discovered that the methods described herein are effective for such data.

Figure 2:
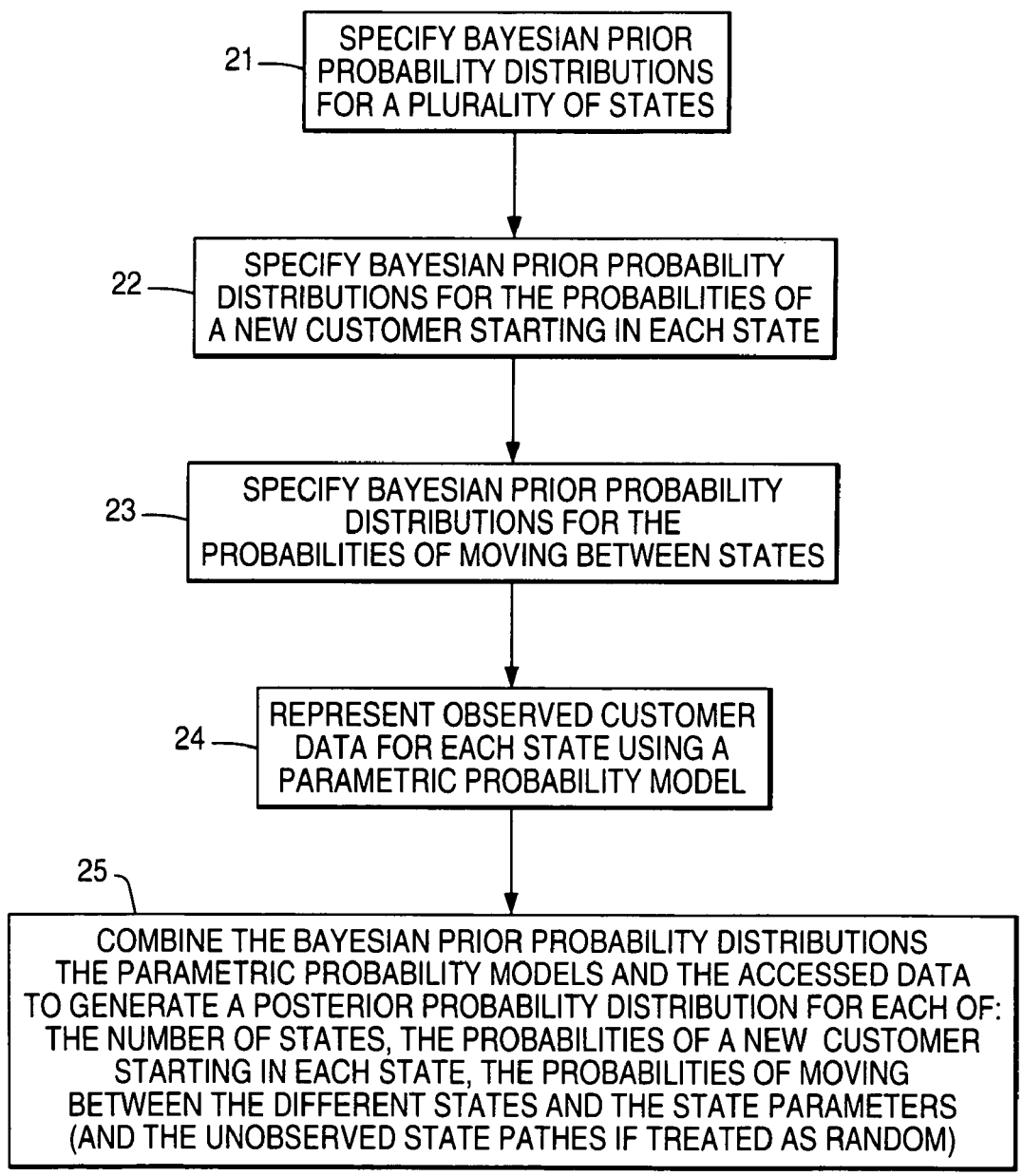
FIG. 2 is a flow diagram showing more detail about the step of generating a Bayesian statistical model from FIG. 1.

FIG. 2 is a flow diagram giving more detail about the step of generating the Bayesian statistical model. Bayesian prior probability distributions are specified for the number of states, the probabilities of a new customer starting in each state, the probabilities of moving between the different states and the state parameters (see boxes 21 to 23 of FIG. 2). As already mentioned, the observed customer data is represented for each state using a parametric probability model (see box 24 of FIG. 2). Using Bayes theorem, the Bayesian prior probability distributions, the accessed data and the parametric probability models are combined to generate a posterior probability distribution for each of:

the number of states;
the probabilities of a new customer starting in each state;
the probabilities of moving between the different states; and
the state parameters (see box 25 of FIG. 2).

In the case that the unobserved state paths are treated as random, posterior probability distributions are also generated for these unobserved state paths.

The posterior probability distribution is then used to generate statistical estimators of future customer behavior. For example, this may be done by using numerical or analytical methods to calculate the posterior probability distribution. Alternatively, and in a preferred embodiment, a sampling method is used to draw approximate random samples from the posterior distribution. Any suitable sampling method such as Gibbs sampling methods may be used. Once the samples have been drawn Monte Carlo inference is analyzed using the samples to generate the statistical estimators. For example, marginal distributions and predictive densities can be performed.

In the case that the customer data comprises information about transactions, the method gives outputs such as probabilities that particular customers will enter into certain transactions. For example, if the customer is a bank customer, the probability that a customer will leave a bank at a certain time can also be estimated. In this way an estimate of the lifetime value of that customer to the bank can be gained.

A detailed example of the method is now described:

Suppose there are R reference customers with whom the customer relationship has now ended and C current customers, and so N=R+C customers overall. Then for each customer i=1, . . . , N, let $n_i$ be the number of time units (e.g. weeks) over which transactions have been recorded. It is assumed that there are three observation types; a vector of attributes, $W_i$, that do not vary over time (e.g. the customer's sex); a matrix with $n_i$ columns of attributes, $X_i$, which change over time but in a deterministic way (e.g. the customer's age each week); and a matrix with $n_i$ columns of transactions, $Y_i$, which change over time in a non-deterministic way (e.g. the number of ATM visits made by a customer each week).

The evolution of customer behavior is represented as a hidden Markov model (HMM) with a random number of states as described in Robert et al (2000). This model says that at any point in time a customer can be described as falling into one of a finite number of sets, and that within states customers will behave in some homogenous way. The number of states n is taken to be unknown and a Bayesian prior distribution is assigned. One choice would be n distributed uniformly between $\{2, 3, \ldots, n_{max}\}$. It is not essential to assume that the number of states is uniformly distributed in this way. Any other suitable distribution for the number of states may be chosen. Each customer transaction history can then be viewed as dependent on an unobserved path $z_i$ of length $n_i$ through these states.

The Markov model is completed by the specification of an n×n transition probability matrix P with $p_{ij}$ the probability of moving from state i to state j. State n is fixed to be the "end" state, representing the end of the customer relationship. Once entered this state cannot be left, so $p_{nn}=1$ and $p_{nj}=0$ for j≠n. No transactions can be observed in this state.

One choice of prior distribution is to assume that, for i=1, . . . , n-1, the i th row $p_i$ of the matrix P follows a Dirichlet distribution with parameter vector $\epsilon_i$. This provides the choice of setting $\epsilon_{ii} \gg \epsilon_{ij}$ for j≠i to make remaining in one's present state much more likely than moving. Write $\pi$ for the stationary distribution of P, so the probability of being at state i at a randomly selected time is $\pi_i$.

It is not essential to use a Dirichlet distribution as described above. Any other suitable distribution could be used. For example, a (n-1) variate normal distribution that is truncated so that each element lies between 0 and 1 and so that its sum is less than or equal to 1 could be used. By using a Dirichlet distribution computational advantages are achieved and it is simple to specify that a customer has a high probability of staying the same state between consecutive "time shots".

If the records of a particular customer start at a random time into the customer relationship, the probability of that customer being in state i when the records commence is $\pi_i$.

If, on the other hand, the records start at the beginning of a customer relationship, then the initial state of the customer might have a different probability distribution, as some states may be more typical than otherwise for customers with whom the relationship has just commenced. Write $q_j$ for the probability of a new customer being in state j, j=1, . . . , n-1. For a prior distribution, again one choice is to assume that the vector of probabilities $q=(q_1, \ldots, q_{n-1})$ follows a Dirichlet distribution with parameter $\epsilon_0$.

For each customer i, define an identifier $b_i$ which takes the value 1 if the records begin at the start of the customer relationship and 0 otherwise.

Now for each customer i=1, . . . N, let $T_i = \{k | k \in \{1, \ldots, n\}, \exists j \in \{1, \ldots, n_i\} \text{ s.t. } z_{ij}=k\}$ be the set of states visited by that customer, and let $S_{ki} = \{j | j \in \{1, \ldots, n_i\}, z_{ij}=k\}$ be the (possibly empty) set of time indices j which customer i spends in state k. Note that $n \in T_i$ if and only if customer i is one of the R reference customers with whom the customer relationship has ended, and that $S_{ni}=\{n_i\}$ for reference customers and $S_{ni}=\emptyset$ otherwise.

Then for each state k define parameter vectors of length r $\theta^{(k)}=(\theta_1^{(k)}, \ldots, \theta_r^{(k)})$ to model the data via suitable parametric models. If conditional independence between customer observations given the parameters is assumed, and if a customers' transactions are also assumed conditionally independent given the parameters, the likelihood function is then given by $$p(W, X, Y, z | n, P, q, \theta) =$$

$$\prod_{i=1}^{N} \left\{ q_{z_{i1}}^{b_i} \pi_{z_{i1}}^{(1-b_i)} \prod_{j=1}^{n_i-1} p_{z_{ij}z_{ij+1}} p(W_i, X_i | \theta^{(k)}, k \in T_i) \prod_{j=1}^{n_i} p(Y_{ij} | \theta^{(z_{ij})}) \right\}$$

$$= \prod_{i=1}^{N} q_{z_{i1}}^{b_i} \pi_{z_{i1}}^{(1-b_i)} \prod_{k=}^{n-1} \prod_{l=1}^{n} p_{kl}^{m_{kl}} \prod_{i=1}^{N} \left\{ p(W_i, X_i | \theta^{(k)}, k \in T_i) \prod_{j=1}^{n_i} p(Y_{ij} | \theta^{(z_{ij})}) \right\}$$

where $$m_{kl} = \sum_{i=1}^{N} \sum_{j=1}^{n_i-1} I\{z_{ij}=k, z_{ij+1}=l\}$$

is the total number of times customers changed from state k to state l.

One choice of prior distribution of the $\theta^{(k)}$ parameters which enables modeling of possible similarities between states through sharing common components, is to use a product of independent Dirichlet processes (see Ferguson, 1973; West et al, 1994). That is, for component i=1, . . . r, $$\theta_i^{(1)}, \ldots, \theta_i^{(n)} \sim DP(\alpha_i F_i)$$

where $\alpha_i$ is a scalar precision parameter and $F_i$ is a base prior which incorporates any prior beliefs that may be held about the distribution of the corresponding parameter component. However, it is also possible to use any other suitable prior distribution.

Bringing this all together, Bayes Theorem gives the posterior distribution of the parameters up to proportionality by $$p(n, P, q, z, \theta \mid W, X, Y) \propto \cdot \prod_{i=1}^{N} q_{z_{i1}}^{b_i} \pi_{z_{i1}}^{(1-b_i)}$$

$$\prod_{k=1}^{n-1}\left\{q_k^{\varepsilon_{0k}-1}\prod_{l=1}^{n} p_{kl}^{\varepsilon_{kl}+m_{kl}-1}\right\}\prod_{i=1}^{N}\left\{p(X_i, W_i|\theta^{(k)}, k\in T_i)\prod_{j=1}^{n_i} p(Y_{ij}|\theta^{(z_{ij})})\right\}$$

$$\times \prod_{i=1}^{r}\prod_{k=1}^{n}\left\{(\alpha_i+k-1)^{-1}\alpha_i\partial F_i(\theta_i^{(k)})+\right.$$

$$\left.(\alpha_i+k-1)^{-1}\sum_{l=1}^{k}\delta(\theta_i^{(l)})\right\}$$

where $\delta(x)$ is a discrete probability mass function placing all its mass on x, and $\partial F_i$ is the probability density/mass function of the distribution $F_i$. The constant of proportionality is the inverse of the multiple integral of the right hand side of the equation above with respect to $\{n, P, q, \theta, z\}$. Analytic calculations with the posterior distribution are therefore complex. In a preferred embodiment, Markov Chain Monte Carlo (MCMC) simulation is used to draw approximate random samples from the posterior distribution for making parameter inference and prediction. However, this is not essential, any other suitable numerical method or analytic methods of calculating the posterior distribution may be used.

In a preferred embodiment, MCMC simulation is used as described above. For example, Gibbs sampling techniques are used. The Gibbs sampler is a MCMC technique for generating from the posterior distribution of a set of model parameters via the full conditional distributions. For a description of the Gibbs sampler and full conditional distributions see Smith and Roberts (1993). Two methods using Gibbs sampling are combined here.

The first was described by Robert et al (2000) for a HMM with a random number of states, but for only one time series of univariate data; the vector parameters $\{\theta^{(1)}, \ldots, \theta^{(n)}\}$ are thus replaced by scalar parameters $\{\sigma^{(1)}, \ldots, \sigma^{(n)}\}$. Because the number of states n is considered random, the MCMC Reversible jump methods of Green (1995) are required to explore the variable dimension parameter space. The jump moves described by Robert et al (2000) are used here to change the number of dimensions, with the only change that methods for deleting or adding a $\sigma^{(k)}$ parameter are here performed identically for each component of $\theta^{(k)}$ in turn. The Dirichlet process prior across states for corresponding components $\{\theta_i^{(1)}, \ldots, \theta_i^{(n)}\}$ provides the advantage that two states that are to be merged have positive probability of already sharing common $\theta_i$ components and thus such a move will be more likely to be accepted. The Gibbs moves for z and P (and here q) are identical to those described by Robert et al (2000).

To create a Gibbs move for the parameters $\{\theta^{(1)}, \ldots, \theta^{(n)}\}$ conditional on $\{n, P, z\}$, the Gibbs sampling strategy of MacEachem (1992) for Dirichlet processes is implemented. However it is not essential to use this particular Gibbs sampling strategy. Any other suitable sampling methods can be used.

Once a large approximate sample from the posterior distribution $\{n, P, q, \theta, z\}^{(1)}, \ldots, \{n, P, q, \theta, z\}^{(M)}$ has been collected, Monte Carlo inference about aspects of the posterior distribution such as marginal distributions and predictive densities can be performed. Thus predictions of customer transactions, how long the customer relationship will last and their lifetime value are all readily available.

The method described herein may be implemented using any suitable programming language executed on any suitable computing platform. For example, Matlab (trade mark) may be used together with a personal computer. A user interface is provided such as a graphical user interface to allow an operator to control the computer program, for example, to adjust the model, to display the results and to manage input of customer data. Any suitable form of user interface may be used as is known in the art.

Figure 4:
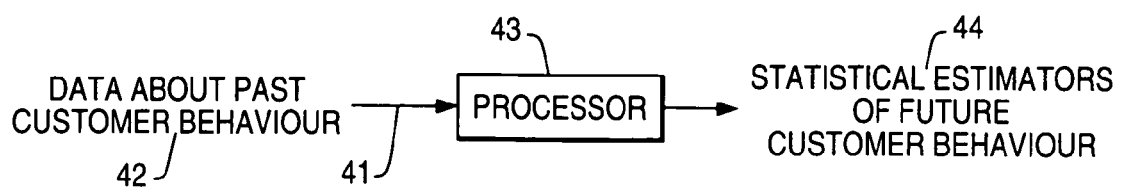
FIG. 4 is a schematic diagram of a computer system.

FIG. 4 is a schematic diagram of a computer system for generating statistical estimators of future customer behavior. Data about past customer behavior 42 is input to a processor 43 via an input 41. The processor uses this data to generate a Bayesian statistical model and using this model to generate statistical estimators 44 of future customer behavior.

A range of applications are within the scope of the invention. These include situations in which it is required to determine one or more statistical estimators of customer behavior. For example, to estimate the probability that a particular customer of a business will stop being a customer (for example by leaving a bank) at a specified time in the future or to estimate the frequency and nature of future customer transactions. Using such estimates the lifetime value of particular customers to a business can be estimated.

References

Ferguson, T. S. (1973) A Bayesian analysis of some nonparametric problems. *Annals of Statistics* 1, 209–230.

Green, P. J. (1995) Reversible jump Markov chain Monte Carlo computation and Bayesian Model determination. *Biometrika* 82, 711–732.

MacEachern, S. M. (1992) Estimating normal means with a conjugate style Dirichlet process prior. Technical report No 487, Department of Statistics, The Ohio State University.

Robert, C. P., Ryden, T., and Titterington, D. M. (2000) Bayesian inference in hidden Markov models through the reversible jump Markov chain Monte Carlo method. *Journal of the Royal Statistical Society Series B—Statistical Methodology* 62, 57–75.

Smith, A. F. M. and Roberts, G. O. (1993) Bayesian computation via the Gibbs sampler and related Markov chain Monte Carlo methods. *Journal of the Royal Statistical Society Series B—Statistical Methodology* 55, 3–23 (with discussion).

West, M., Mueller, P. and Escobar, M. D. (1994) Hierarchical priors and mixture models with applications in regression and density estimation. *Aspects of Uncertainty: a Tribute to D. V Lindley* (P. R. Freeman, and A. F. M. Smith, eds.). Chichester: Wiley.

The invention claimed is:

1. A computer-implemented method of determining one or more statistical estimators of future customer behavior, the computer-implemented method comprising the steps of:
   (i) accessing data about past customer behavior;
   (ii) generating a Bayesian statistical model using the data about the past customer behavior; and
   (iii) using the model to generate one or more statistical estimators of future customer behavior, wherein the step of generating the Bayesian statistical model comprises specifying a plurality of Bayesian prior probability distributions.

2. A computer-implemented method as claimed in claim 1, wherein the step of generating the model further comprises generating a plurality of Bayesian posterior probability distributions on the basis of at least the plurality of Bayesian prior probability distributions and the past customer data.

3. A computer-implemented method of determining one or more statistical estimators of future customer behavior, the computer-implemented method comprising the steps of:
 (i) accessing data about past customer behavior;
 (ii) generating a Bayesian statistical model using the data about the past customer behavior; and
 (iii) using the model to generate one or more statistical estimators of future customer behavior;
wherein the step (iii) of using the model to generate one or more statistical estimators comprises the step of using a sampling method to draw approximate random samples from the posterior distribution and performing Monte Carlo inference using the samples to generate the statistical estimators.

4. A computer-implemented method of determining one or more statistical estimators of future customer behavior, the computer-implemented method comprising the steps of:
 (i) accessing data about past customer behavior,
 (ii) generating a Bayesian statistical model using the data about the past customer behavior; and
 (iii) using the model to generate one or more statistical estimators of future customer behavior,
wherein the step (iii) of using the model to generate one or more statistical estimators comprises the step of numerically or analytically calculating the Bayesian posterior probability distributions.

* * * * *